Patented Jan. 2, 1951

2,536,107

UNITED STATES PATENT OFFICE 2,536,107

COATING COMPOSITION AND METHOD OF USING SAME

Nathan Sugarman, Atlanta, Ga., and Foster M. Fryman, Newport Beach, Calif., assignors to The Standard Register Company, Dayton, Ohio, a corporation of Ohio No Drawing. Application January 16, 1947, Serial No. 722,460

14 Claims. (Cl. 117—62)

1

This invention relates to a composition which when applied as a liquid coating upon an object will set and harden quickly.

It is an object of this invention to prepare a coating composition of a liquid consistency, which when applied as a thin film on an object may be hardened by a short exposure to gaseous sulfur dioxide with or without the application of heat.

It is more particularly an object of this invention to prepare a film-forming composition for carbon block-out which will set and harden quickly.

Other objects of this invention and the various advantages will, in part, be obvious, and will, in part, appear hereinafter as the description proceeds.

According to our invention these and other objects are attained by forming a liquid, rapidly hardening coating composition characterized by a liquid, partial condensate of furane-type aldehyde and an aryl diamine, the ratios of the former to the latter being substantially 2:1 to 4:1. Other film-forming materials may be present such as cellulose ethers and -esters, synthetic resins, plasticizers and wetting agents.

The preferred aryl diamine is 2,4-diaminotoluene. The most readily available furane-type aldehyde is furfural. However heat polymerized furfural is the preferred cyclic aldehyde because it allows a faster hardening after the coating composition has been applied as a film. The presence of a small amount of iodine to the liquid mixture increases the speed of hardening.

Instead of 2,4-diaminotoluene other aryl diamines may be employed. Examples of these are: phenylene diamine and the xylenes diamines.

Instead of furfural or polymerized furfural other furane-type aldehydes such as methyl furfural, ethyl furfural may be used.

The furfural has a dual role in the composition. When furfural is mixed with the amine heat is engendered. A condensation of some type takes place between these two components. The excess furfural also acts as a solvent or diluent for this condensate and the other components of the film-forming composition. Furfural may be used in ratios of 2:1, 3:1 or 4:1 in reference to the 2,4-diaminotoluene. The last ratio is the preference. Larger amounts of furfural could be employed but the drying time would be decreased due to the excess solvent which must be volatilized.

The mixing of the furfural with the aryl diamine engenders heat, which causes a more rapid condensation; this is manifested by a subsequent thickening or increase of viscosity of the final mix. But such a physical property makes the final product more difficult to apply in a thin film. However, by cooling the mixture during the addition of the furfural to the amine, condensation is arrested. A homogeneous mixture can be thus secured. This can be applied in its non-viscous state or condition.

After the coating mixture is applied and a film is formed on an object, hardening thereof takes place regardless of whether the furfural and amine were mixed with or without cooling. During this setting or drying period, which is of the order of 30 seconds or less, it is our belief that condensation of the diamine with the furfural takes place or continues to completion where initiated or partially carried out previously.

The furfural and diamine may be brought together in the absence of other components which are employed in the coating composition. This is true whether the mixture of these two components is cooled, or the heat from the exothermic reaction is not dissipated or even where heat is applied.

As stated supra, it is preferred to employ furfural which has been pre-polymerized by heating for a period of time. It has been found that the use of polymerized furfural in the coating composition allows a faster hardening as compared with non-polymerized furfural.

A convenient way to secure polymerized furfural is by heating it with 0.1% of anhydrous aluminum chloride for four hours and then cooling quickly.

In order more particularly to describe the present invention, there follow two typical embodiments. It is to be understood that the features as set forth in the embodiments are by way of illustration only and are not to be construed in a limiting sense.

Example 1

| Ingredients: | Parts by weight |
|---|---|
| Heat polymerized furfural | 20 |
| Tetrahydrafurfural phthalate | 12 |
| Emulsifier #87 [1] (Victor Chem. Works) | 1 |
| Ethyl cellulose—low viscosity | 1 |
| Rezyl #12 [2] | 4 |
| 2,4-diaminotoluene | 5 |

[1] An organic phosphorus derivative containing long chain alkyl groups as well as water solubilizing groups.
[2] An alkyd resin made with non-drying oils and containing approximately 49% phthalic anhydride.

The constituents are mixed in the order given above. Heat may be used to dissolve the solids, but the composition should be cooled during the addition of the 2,4-diaminotoluene.

This composition may be printed as a film on the carbon paper, and this film will harden in 15 seconds when placed in an atmosphere of sulfur dioxide.

Example 2

| Ingredients: | Parts by weight |
|---|---|
| Furfural | 20 |
| Dibutyl phthalate | 10 |
| Emulsifier #87 [1] | 1 |
| 2,4-diaminotoluene | 7 |
| Ethyl cellulose—low viscosity | 1 |
| Rezyl #12 [2] | 4 |

[1] An organic phosphorus derivative containing long chain alkyl groups as well as water solubilizing groups.
[2] An alkyd resin made with non-drying oils and containing approximately 49% phthalic anhydride.

The constituents are mixed in the order given above. The same precaution as to temperature conditions set out in Example 1 should be observed.

While in the above examples a certain order of mixing has been specified, this is not critical, although preference may be held because of mechanical aspects or even to govern the degree of condensation between the amine and the aldehyde. The components may in fact be mixed simultaneously.

As mentioned supra and as disclosed more specifically in the examples, other film-forming constituents may be present than the aryl diamine and the furane-type aldehyde. At least one of each of the previously mentioned types of these materials may be incorporated.

Various cellulose esters may be used such as cellulose nitrate, cellulose acetate, cellulose formate, cellulose butyrate and cellulose propionate.

Examples of cellulose ethers which may be used are ethyl cellulose, methyl cellulose and benzyl cellulose.

Various plasticizers also may be used, such as triphenyl phosphate, tricresyl phosphate, triacetin, camphor, p-toluene- or xylene sulphonamide, diethyl phthalate, dibutyl phthalate and dibutyl tartrate.

Various resins may be used. Illustrative of the synthetic resins are the phenol-formaldehyde resins (Bakelite type) and alkyd resins. The term phenol is in the references to include, besides hydroxybenzol ($C_6H_5OH$), all homologues and also polyphenols such as resorcin and the like and the naphthols and their derivatives with a free hydroxyl group. Also compounds having free hydroxyl groups such as methylene diphenol $CH_2(C_6H_4OH)_2$, diphenylol propane $(CH_3)_2C(C_6H_4OH)_2$, and similar compounds in which the phenyl group is replaced by the naphthyl group may be used to prepare the resin.

Pigments or dyes or other materials may be added to the composition to impart such properties as are desired in the finished product, as is well understood in the liquid coating art.

Mixtures of these several group representative materials may be compounded.

The invention presents advantages over the present liquid coating compositions which are printed as a film on carbon paper because formulae of the preferred ingredients in chosen ratios dry in a matter of seconds in an atmosphere of sulfur dioxide or other acidic gases. It has other uses in the field of liquid coating compositions. It can be applied as a film to the chosen objects by spraying, dipping or brushing.

It is apparent that many widely different embodiments of this invention may be made without departing from the spirit and scope thereof and, therefore, is not to be limited except as indicated by the appended claims.

We claim:

1. A liquid, rapid drying composition comprising a liquid, partial condensate of polymerized furfural and an aromatic diamine, wherein the two amino groups are substituted directly on the aromatic nucleus, the ratio of the polymerized furfural to the aromatic diamine being substantially 2:1–substantially 4:1, a member of the group consisting of cellulose ethers and cellulose esters, a plasticizer and a wetting agent, said composition when applied as a thin film being capable of hardening in a period of not over 30 seconds by exposure to an atmosphere of sulfur dioxide.

2. A liquid, rapid drying composition comprising a liquid, partial condensate of furfural and 2,4-diaminotoluene, the ratio of the former to the latter being substantially 2:1–substantially 4:1, a member of the group consisting of cellulose ethers and cellulose esters, a plasticizer and a wetting agent, said composition when applied as a thin film being capable of hardening in a period of not over 30 seconds by exposure to an atmosphere of sulfur dioxide.

3. The process of coating comprising the steps of forming a film of a liquid composition comprising a liquid, partial condensate of polymerized furfural and 2,4-diaminotoluene in the component ratios 2:1–4:1 substantially, upon carbon paper, thereafter exposing said film to an atmosphere of sulfur dioxide until it hardens.

4. The process of coating comprising the steps of forming a film of a liquid composition comprising a liquid, partial condensate of polymerized furfural and 2,4-diaminotoluene in the component ratios 2:1–4:1 substantially, a member of the group consisting of cellulose ethers and cellulose esters, a plasticizer, a resin and a wetting agent, upon carbon paper, thereafter exposing said film to an atmosphere of an acidic gas until it hardens.

5. The process of coating comprising the steps of forming a film of a liquid composition comprising a liquid, partial condensate of a member of the group consisting of furfural, polymerized furfural and a short chain alkyl substituted furfural with an aromatic diamine in the component ratios of substantially 2:1–4:1, upon carbon paper, the said diamine having two amino groups directly substituted on the aromatic nucleus thereafter exposing said film to an acidic gas until it hardens.

6. The process of coating comprising the steps of forming a film of a liquid composition comprising a liquid, partial condensate of a member of the group consisting of furfural, polymerized furfural and a short chain alkyl substituted furfural with 2,4-diaminotoluene in the component ratios of substantially 2:1–4:1, upon carbon paper, thereafter exposing said film to an acidic gas until it hardens.

7. A liquid, rapidly hardening coating composition comprising a liquid, partial condensate of a member of the group consisting of furfural, polymerized furfural and a short chain alkyl substituted furfural, with an aromatic diamine wherein the two amino groups are substituted directly on the aromatic nucleus, the ratios of the aldehyde to the diamine being substantially 2:1 to 4:1.

8. A liquid, rapidly hardening coating composition comprising a liquid, partial condensate of a member of the group consisting of furfural, polymerized furfural and a short chain alkyl substituted furfural, with 2,4-diaminotoluene, the ratios of the aldehyde to the diamine being substantially 2:1 to 4:1.

9. A liquid, rapidly hardening coating composition comprising a liquid, partial condensate of polymerized furfural and an aromatic diamine wherein the two amino groups are substituted directly on the aromatic nucleus, the ratios of the aldehyde to the diamine being substantially 2:1 to 4:1.

10. A liquid, rapidly hardening coating composition comprising a liquid, partial condensate of polymerized furfural and 2,4-diaminotoluene, the ratios of the aldehyde to the diamine being substantially 2:1 to 4:1.

11. A liquid, rapidly hardening composition comprising a liquid, partial condensate of a member of the group consisting of furfural, polymerized furfural and a short chain alkyl substituted furfural, with an aromatic diamine wherein the two amino groups are substituted directly on the aromatic nucleus, the ratios of the aldehyde to the diamine being substantially 2:1 to 4:1, and a member of the group consisting of cellulose ethers and cellulose esters, a plasticizer, and a wetting agent, the said partial condensate exceeding by weight any of these other recited components.

12. A liquid, rapidly hardening composition comprising a liquid, partial condensate of a member of the group consisting of furfural, polymerized furfural and a short chain alkyl substituted furfural, with 2,4-diaminotoluene, the ratios of the aldehyde to the diamine being substantially 2:1 to 4:1, and a member of the group consisting of cellulose ethers and cellulose esters, a plasticizer, and a wetting agent, the said partial condensate exceeding by weight any of these other recited components.

13. A liquid, rapidly hardening coating composition comprising a liquid, partial condensate of a member of the group consisting of furfural, polymerized furfural and a short chain alkyl substituted furfural, with an aromatic diamine wherein the two amino groups are substituted directly on the aromatic nucleus, the ratios of the aldehyde to the diamine being substantially 2:1 to 4:1, and a small amount of iodine.

14. A liquid, rapid hardening composition comprising a liquid, partial condensate of a member of the group consisting of furfural, polymerized furfural and a short chain alkyl substituted furfural, with 2,4-diaminotoluene, the ratios of the aldehyde to the diamine being substantially 2:1 to 4:1, and a small amount of iodine.

NATHAN SUGARMAN.
FOSTER M. FRYMAN.

REFERENCES CITED

The following references are of record in the file of this patent:

UNITED STATES PATENTS

| Number | Name | Date |
| --- | --- | --- |
| 1,441,598 | Phillips | Jan. 9, 1923 |
| 2,037,710 | Ellis | Apr. 21, 1936 |

FOREIGN PATENTS

| Number | Country | Date |
| --- | --- | --- |
| 320,649 | Great Britain | Oct. 18, 1929 |